United States Patent [19]

Hartouni et al.

[11] Patent Number: 4,468,117
[45] Date of Patent: Aug. 28, 1984

[54] INTEGRATED OPTICAL FIBER TESTING DEVICE

[75] Inventors: Edward Hartouni, Claremont; Craig R. Duda, San Dimas, both of Calif.

[73] Assignee: General Dynamics, Pomona, Calif.

[21] Appl. No.: 351,062

[22] Filed: Feb. 22, 1982

[51] Int. Cl.³ .................. G01N 21/84; G01N 21/88
[52] U.S. Cl. .................................. 356/73.1; 356/239
[58] Field of Search ...................... 356/73, 73.1, 239

[56] References Cited

FOREIGN PATENT DOCUMENTS 3039088 10/1981 Fed. Rep. of Germany ..... 356/73.1
156830 12/1980 Japan .................................. 356/73.1

OTHER PUBLICATIONS

"Industrialized System for the Automated Measurements of the Optical Properties of Waveguide Fibers"; Murphy et al., Symposium on Optical Fiber Measurements, 1980, (NBS-SP-597) Oct. 28–29, 1980, pp. 105–111.

"Military Standard–Fiber Optics Test Methods and Instrumentation" DOD-STD 1678, Nov. 30, 1977, pp. 2060–2063 and 4010–4011 to 4010–4014.

*Primary Examiner*—Vincent P. McGraw
*Attorney, Agent, or Firm*—Neil F. Martin; Michael H. Jester; Edward B. Johnson

[57] ABSTRACT

An integrated optical fiber testing device includes means for accurately aligning one end of a fiber optic cable with a laser beam generator and the other end with a beam detector. The cable is positioned in a test chamber wherein it is exposed to various mechanical and thermal stresses to determine its ability to withstand these stresses while light is passing through the cable. The testing is completed in one integrated operation.

16 Claims, 6 Drawing Figures

INTEGRATED OPTICAL FIBER TESTING DEVICE

BACKGROUND OF THE INVENTION

Optical fibers are being utilized on a rapidly increasing scale in many applications such as computer control and communications systems. The recent development of optical wave guide communication from prototype and laboratory devices into communication equipment has created a need for verification testing which includes vibration, shock, cyclic flexing, twisting, tensile load and power transmission versus temperature.

Apparatus presently exists for testing various requirements individually. After each of these tests, the optical fiber cable is re-tested for light transmission to demonstrate that the structural and mechanical testing have not changed the fibers' expected overall performance. The fibers must be handled several times and this approach is time-consuming and expensive.

It is an object of the present invention to provide a new and improved device for testing optical fiber cables wherein mechanical and thermal tests are conducted on the fiber cables while a light beam is passed through the cable, all such tests being accomplished during one positioning of the cable and one operation of the device.

It is another object of the present invention to provide a new and improved device for testing optical fiber cables which reduces handling and labor costs associated with the testing.

It is a further object of the present invention to provide a new and improved device for testing optical fiber cables which is efficient and easy to use.

SUMMARY OF THE INVENTION

An exemplary embodiment of the present invention described herein solves the problems of the prior art and attains the desired objectives with a single device that includes means for testing the mechanical and thermal characteristics of an optical fiber cable in one operation while light is introduced into the cable from a beam source and conductivity is continually checked during testing.

DETAILED DESCRIPTION OF THE INVENTION

Figures 1, 2:
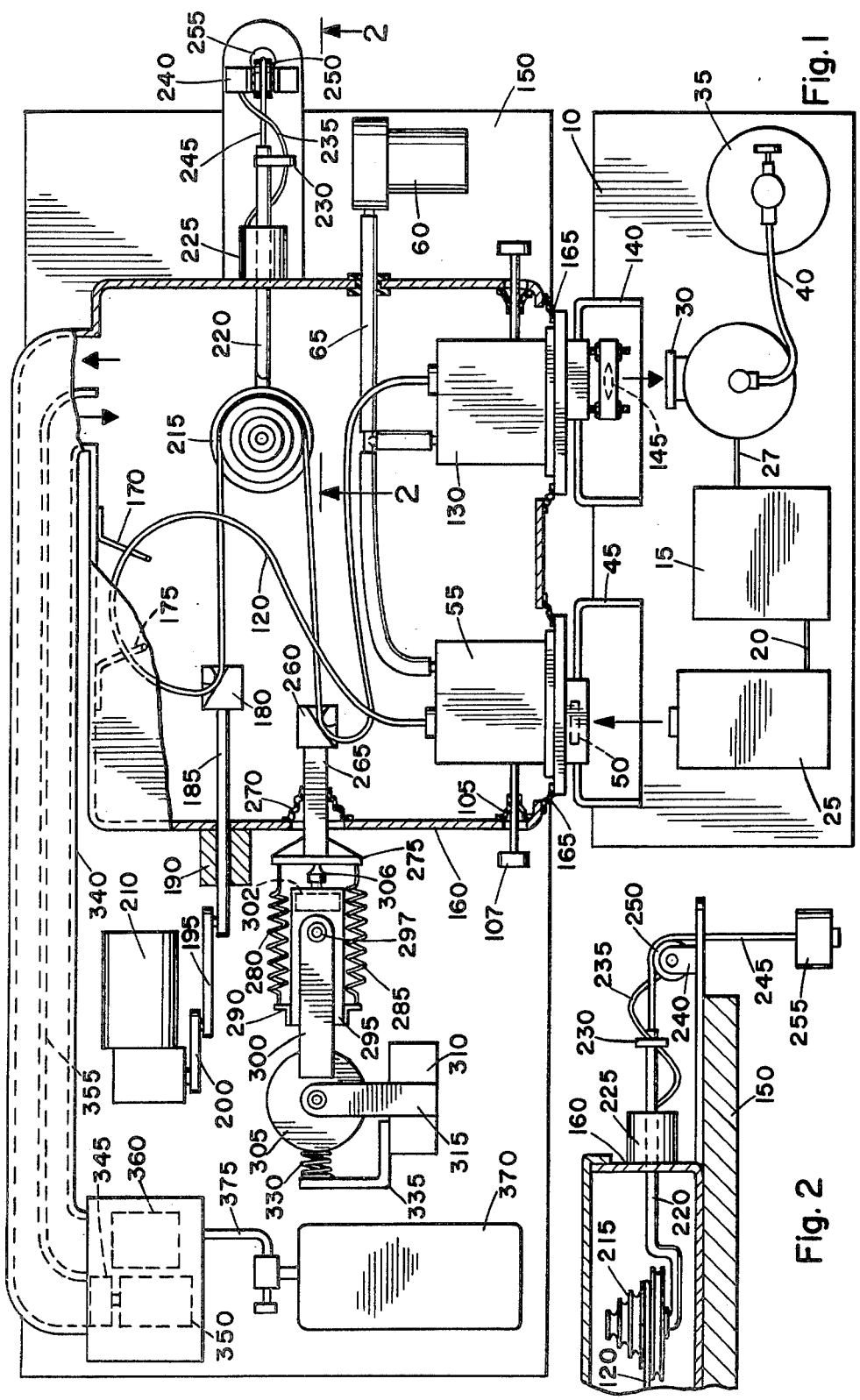
FIG. 1 is a top plan view of the device of the present invention with portions cut away.
FIG. 2 is a sectional view taken on line 2—2 of FIG. 1.

Referring to the drawings, an optical table is shown at 10. A power source 15 is affixed to optical table 10 and includes controls and a recorder (not shown). The power source is electrically connected through electrical cable 20 to a laser beam generator 25 mounted on optical table 10. The recording section of power source 15 is connected through electric cable 27 to a laser beam detector 30. The laser beam detector is cooled from a source of nitrogen 35 connected to the detector through line 40.

A mount 45 is secured to optical table 10. The mount includes a special glass window 50 (FIG. 3) aligned with the output at the top of laser generator 25. The mount also includes a vacuum chamber 55 connected to a vacuum pump 60 through line 65. The vacuum chamber is connected to the main table 150 as described later herein. The vacuum chamber prevents condensation of moisture on the window and the consequent interference with light transmission.

Figure 3:
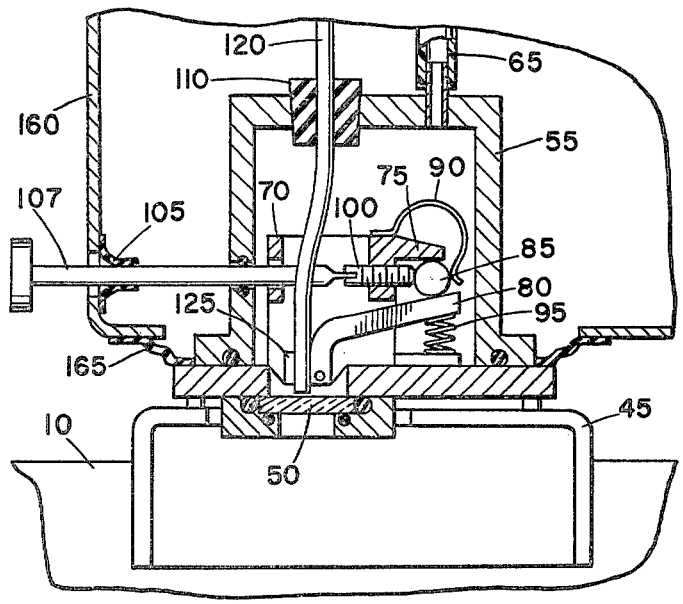
FIG. 3 is an enlarged elevation view, partially cut away, of one cable and holding fixture.

Positioned within vacuum chamber 55 is a holding device including a body portion 70 which includes a fixed finger 75 thereon (FIG. 3). A movable finger 80 is pivotally connected to body portion 70 and a ball 85 is positioned between the fingers. A spring 90 retains the ball between the fingers at one end. A spring 95 is positioned beneath the movable finger. An adjusting screw 100 is in threaded engagement with the body portion 70 and can be moved in and out against the ball 85 by adjusting rod 107 while the ball is maintained in position between the spring 90 and the adjusting screw 100. A seal is provided at 105 around adjusting rod 107 to prevent leakage of air into the vacuum chamber. A sealing guide 110 accommodates a fiber optic cable 120 which is to be tested. The guide is formed of a resilient material so that the integrity of the vacuum chamber 55 is maintained. One end of the fiber optic cable 120 is positioned between a clamping boss 125 on the body portion 70 and the movable finger 80. The end of the fiber optic cable 120 aligns with the laser beam generator so that a laser beam is introduced into the end of the fiber optic cable through the window 50. The adjusting screw 100 has very fine threads and permits adjustments within millionths of an inch for alignment of the end of the fiber optic cable 120 with the laser beam.

A second vacuum chamber is provided at 130 that is identical to the construction of the vacuum chamber 55 including the same type of holding and adjusting device for holding and positioning the other end of the fiber optic cable 120. The vacuum chamber is positioned on mount 140. The mount includes an adjustable lens 145 for focusing the laser beam from the fiber optic cable onto the laser beam detector 30. Thus, a light circuit is continuously provided through the fiber optic cable from the laser beam generator 25 to the detector 30 to test the quality of the cable in transmitting a light signal while the fiber optic cable is being subjected to various tests. The lens 145 is adjustable to provide the desired focus.

An insulated test chamber 160 is mounted on main table 150. It is connected to optic table 10 through resilient diaphragms 165 and encloses fiber optic cable 120 while it is being tested. The resilient diaphragms 165 isolate the optic table 10 from vibration of the chamber 160. The fiber optic cable is threaded through guides 170 and 175 and through a directional clamp 180 on the end of a push rod 185. The push rod extends out of the chamber member 160 and through sleeve 190 and is pivotally coupled with a link 195 which in turn is pivotally connected to a crank 200 on an adjustable speed electric motor 210. Rotation of the crank 200 moves the push rod 185 and clamp 180 back and forth in the chamber member 160.

The fiber optic cable 120 is then passed around a pulley 215. The pulley has a plurality of sections of different diameter so that the fiber optic cable can be bent around different diameters for different kinds of cable or for different tests. The pulley 215 is rotatably mounted on shaft 220. Shaft 220 extends out of the chamber member 160 through sleeve 225 and has a pawl member 230 thereon. The pawl member engages a helical guide track 235 which is secured to the end of the sleeve 225 and to the support 240, for guiding the shaft 220 in a helical path. The shaft 220 has a cable 245 extending over a pulley 250 and connected to an adjustable weight 255. The adjustable weight creates a tensile force in the fiber optic cable 120 and holds the cable tight against the directional clamp 180. The forces are intensified when the push rod 185 is pulled against the weight 255.

When the push rod 185 reciprocates, the shaft 220 is moved through a helical path and twists the fiber optic cable 120 to test its ability to withstand twisting forces. The cable is twisted through one hundred and eighty degrees and through a motion like wringing out a towel. Reciprocation of pushrod 185 also serves to cyclically stretch and thereby flex the cable.

After being positioned around the pulley 215, the fiber optic cable 120 is threaded through directional clamp 260 on vibrator rod 265. The vibrator rod 265 extends through diaphragm seal 270 on test chamber 160 and is connected to impact flange 275. Springs 280 and 285 extend from flange 275 to collar 290. A cylindrical housing 295 is connected to collar 290. The springs 280 and 285 take up slack during vibration. A shaft 300 is loosely coupled at one end to the housing 295 at 297. The other end of shaft 300 is connected to damping weight 305. An electric vibrator 302 is positioned within housing 205 and is connected to an anvil 306. The vibrator 302 hammers the anvil 306 against the impact flange 275 to impart shock to and to vibrate rod 265 and the fiber optic cable 120.

The weight 305 is connected to a support 310 on table 150 by a bracket 315. A spring 330 is connected to the weight 305 and to a bracket 335 which in turn is connected to support 310. This arrangement accommodates the vibration imparted to the fiber optic cable 120 and dampens it with respect to the table 150. The fiber optic cable passes from directional clamp 260 to its attaching point on the vacuum chamber 130.

The test chamber 160 includes a passage 340. A fan 345 driven by electric motor 350 is positioned in the inlet portion of the passage and draws air from the test chamber 160. The passage is divided by separator 355 and the air from the test chamber 160 is passed into the outlet portion of passage 340 over electric heater 360 which is energized by a power source (not shown). A source of chilled air 370 is connected to main table 150 and a pipe 375 extends from the source 370 to the passage 340. Thus air is circulated around the fiber optic cable 120 as it is being tested. The temperature ranges from about plus forty degrees centigrade to about minus forty degrees centigrade by an automatic temperature cycling control (not shown).

Figure 4:
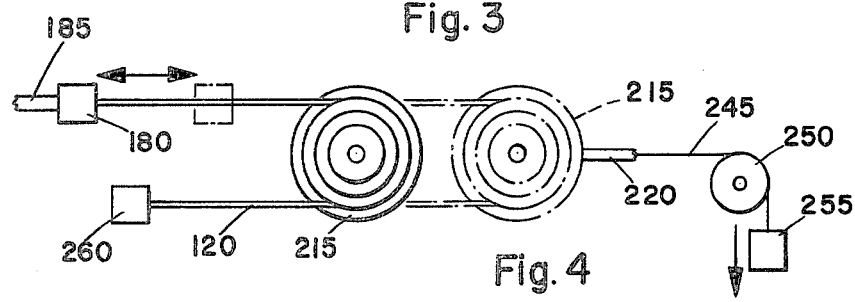
FIGS. 4–6 illustrate diagrammatically the various testing functions of the apparatus.
Figure 5:
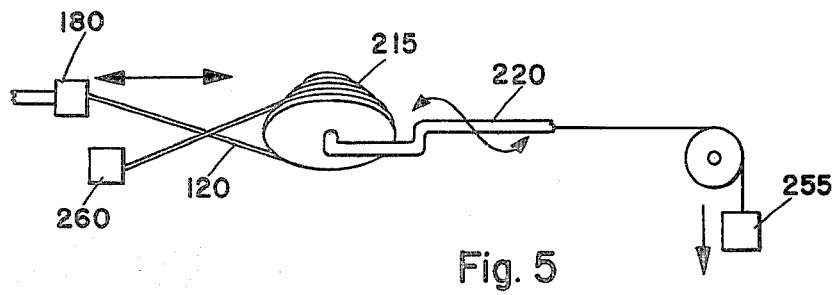
Figure 6:
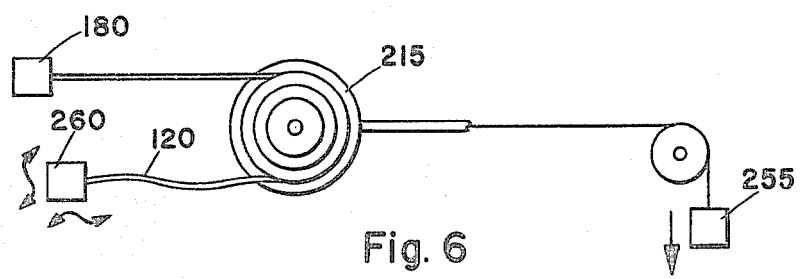

FIGS. 4, 5 and 6 of the drawings demonstrate the various mechanical tests being performed on the fiber optic cable while it is transmitting light from the laser beam generator to the beam detector. Any transmission failure will be picked up by the beam detector and recorder.

FIG. 4 demonstrates the reciprocating motion against a weight.

FIG. 5 shows the twisting stress placed upon the cable.

FIG. 6 demonstrates the vibration which is imparted to the cable.

The integrated optical fiber testing device of the present invention combines thermal and mechanical testing of the fiber cable in one operation while light is continuously introduced into the cable. The tests can be conducted simultaneously due to the construction of the device.

Having thus described our invention, we claim:

1. A device for performing multiple tests on an optical fiber cable in one integrated operation, comprising:
   means for holding one end of a fiber optic cable in alignment with a light source means;
   light source means for introducing a light beam into one end of said fiber optic cable;
   means for holding the opposite end of said fiber optic cable in alignment with detecting means for continuously measuring the light transmission through said fiber optic cable; and
   means for simultaneously conducting multiple mechanical tests on said fiber optic cable as light transmission therethrough is continuously measured, including means for simultaneously vibrating, imparting shock to, flexing, twisting, and imparting a tensile load on the cable, during one positioning of the cable and in one operation;
   whereby the light transmission characteristics of said fiber optic cable are continuously checked during the testing.

2. A device for testing a fiber optic cable according to claim 1 including means for recording said light transmission characteristics.

3. A device for testing a fiber optic cable according to claim 1 or 2 wherein means is provided for varying the temperature of the fiber optic cable while it is being subjected to mechanical tests.

4. A device for testing a fiber optic cable according to claim 1 wherein the ends of said fiber optic cable are enclosed in vacuum chambers.

5. A device for testing a fiber optic cable according to claim 3 wherein said light source means and detecting means are mounted on an optical table;
   mechanical and thermal testing means is mounted on a separate main table; and
   the light source means and detecting means are resiliently coupled to the testing means to avoid vibration in the light source means and detecting means.

6. A device for testing a fiber optic cable according to claim 5 wherein vibration generating means is provided for engaging and vibrating said fiber optic cable;
   shocking means is provided for engaging and shocking said fiber optic cable;
   cyclic flexing means is provided for engaging and flexing said fiber optic cable;
   twisting means is provided for engaging and twisting said fiber optic cable; and
   tensile load means is provided for engaging and providing tensile stress on said fiber optic cable;
   said shocking, flexing, twisting and tensile stress being conducted in one operation.

7. A device for testing a fiber optic cable according to claim 6 wherein the several tests are conducted in a test chamber on said main table; and
   said test chamber is connected to heating and cooling means for varying the temperature in said chamber.

8. A device for testing a fiber optic cable according to claim 7 wherein clamping means is provided for clamping one end of said cable in alignment with the light source means;
   a reciprocating rod extends into said test chamber for gripping said fiber optic cable;
   said fiber optic cable is passed around pulley means that travels in a helical path; and said fiber optic cable is gripped by vibrating means.

9. A device for testing a fiber optic cable according to claim 8 including resistance means for resisting displacement of said pulley means along its helical path.

10. A device for testing a fiber optic cable according to claim 9 wherein said pulley means includes pulley sections of different diameters to provide different degrees of bending.

11. A device for testing a fiber optic cable according to claim 9 wherein said pulley means is mounted on a rod having pawl means thereon; and
a helical track is provided upon which said pawl means rides to impart twisting movement to said pulley means.

12. A device for testing a fiber optic cable, comprising:
means defining a light source for introducing a beam of light into one end of a fiber optic cable;
means for holding one end of said fiber optic cable in alignment with the light source;
first gripping means for gripping said fiber optic cable and imparting reciprocating movement thereto to flex the cable;
pulley means for accepting said fiber optic cable from said first gripping means, said pulley means being movable in a helical path to impart twisting movement to said fiber optic cable and including weight means coupled thereto to resist such movement and impart a tensile load on the cable, said pulley means and weight means functioning simultaneously with the first gripping means;
second gripping means for gripping said fiber optic cable after it passes around said pulley means and imparting shock and vibratory movement thereto simultaneously with the first gripping means and in one operation during one positioning of the cable; and
means for holding the other end of said fiber optic cable in alignment with a beam detector for detecting the light transmission characteristics of the fiber optic cable continuously as it is being tested.

13. A device for testing a fiber optic cable according to claim 12 wherein said first gripping means, pulley means and second gripping means are enclosed in a test chamber; and
temperature varying means is connected with said chamber for varying the temperature to test the thermal characteristics of said cable while it is transmitting light.

14. A device for testing a fiber optic cable according to claim 13 wherein said reciprocating movement, twisting movement, vibratory movement and temperature variation are imparted to said fiber optic cable simultaneously.

15. The method of testing a fiber optic cable comprising the steps in one integrated operation of:
measuring light transmission through the cable;
vibrating said fiber optic cable;
imparting shock to said fiber optic cable;
flexing said fiber optic cable;
twisting said fiber optic cable; and imparting a tensile load on said fiber optic cable.

16. The method of testing a fiber optic cable according to claim 15 including the step of varying the temperature of said fiber optic cable during said mechanical testing operation.

* * * * *

UNITED STATES PATENT AND TRADEMARK OFFICE
CERTIFICATE OF CORRECTION

PATENT NO. : 4,468,117
DATED : August 28, 1984
INVENTOR(S) : Edward Hartouni and Craig R. Duda It is certified that error appears in the above-identified patent and that said Letters Patent are hereby corrected as shown below:

In the specification, Column 1, line 3, before BACKGROUND OF THE INVENTION, insert --The Government has rights in this invention pursuant to Contract No. N0429A -80-C-1975, awarded by the U. S. Navy.--

Signed and Sealed this

Twenty-eighth Day of May 1985

[SEAL]

Attest:

DONALD J. QUIGG

Attesting Officer

Acting Commissioner of Patents and Trademarks